US006419279B1

(12) United States Patent
Latham

(10) Patent No.: US 6,419,279 B1
(45) Date of Patent: Jul. 16, 2002

(54) THREADED RETAINER RINGS FOR USE IN PIPE FLANGE CONNECTIONS

(76) Inventor: Raymond E. Latham, 231 Tamerlaine, Houston, TX (US) 77024

( * ) Notice: Subject to any disclaimer, the term of this patent is extended or adjusted under 35 U.S.C. 154(b) by 0 days.

(21) Appl. No.: 09/460,166

(22) Filed: Dec. 13, 1999

(51) Int. Cl.$^7$ ........................ F16L 27/06; F16L 27/053; F16B 43/00
(52) U.S. Cl. ........................ 285/261; 285/368; 285/412; 411/107; 411/533; 411/999
(58) Field of Search ................................. 285/368, 412, 285/261; 411/107, 533, 970, 999

(56) References Cited

U.S. PATENT DOCUMENTS

| | | |
|---|---|---|
| 1,057,939 A | 4/1913 | Cooper |
| 1,236,816 A | 8/1917 | Behan |
| 1,917,742 A | 7/1933 | Tinsley |
| 2,456,744 A | 12/1948 | Sjoberg .................... 285/94 |
| 2,519,147 A | 8/1950 | Miller ..................... 285/97.3 |
| 2,564,938 A | 8/1951 | Warren ..................... 285/95 |
| 2,833,566 A | 5/1958 | Meter et al. ................ 285/18 |
| 3,178,207 A | 4/1965 | Fox et al. .................. 285/165 |
| 3,477,748 A | 11/1969 | Tinsley ..................... 285/267 |
| 3,746,372 A | 7/1973 | Hynes et al. ................ 285/95 |
| 3,860,271 A | 1/1975 | Rodgers .................... 285/97 |
| 3,874,706 A | 4/1975 | Arnold ..................... 285/24 |
| 4,012,060 A | 3/1977 | Reneau ..................... 285/93 |
| 4,068,864 A | 1/1978 | Herbert et al. ............... 285/49 |
| 4,082,320 A | 4/1978 | Weinhold ................... 285/31 |
| 4,129,306 A | 12/1978 | Konno et al. ................ 277/30 |
| 4,153,281 A | 5/1979 | Ahlstone ................... 285/167 |
| 4,180,285 A | 12/1979 | Reneau ..................... 285/261 |
| 4,195,865 A | 4/1980 | Martin ..................... 285/18 |
| 4,381,871 A | 5/1983 | Dopyera et al. .............. 285/261 |
| 4,486,037 A | 12/1984 | Shotbolt ................... 285/261 |
| 4,530,526 A | 7/1985 | Dopyera et al. .............. 285/261 |
| 4,640,348 A | * 2/1987 | Roberts .................... 165/158 |
| 5,368,342 A | 11/1994 | Latham et al. .............. 285/261 |

FOREIGN PATENT DOCUMENTS

| | | |
|---|---|---|
| DE | 261434 | 7/1912 |
| DE | 821890 | 11/1951 |
| DE | 2737621 | 2/1979 |
| FR | 811007 | 4/1937 |
| GB | 1097267 | 1/1968 |
| GB | 2068489 | 8/1981 |

OTHER PUBLICATIONS

Gripper, Inc. Drawing; Gripper Ball Connector–Flange Lok No. 75–0068 Bulletin—Jan.—76 (1 p.).
Gripper, Inc. Drawings, Gripper Ball Connector Flange Lok, Flange End By Weld End (3 pp.).
Pipeline Construction Products, Misaligning Flange™ Connector, HydroTech Systems (12 pp.).
Misaligning Flange™, Hydrotech Offshore, *The Journal of Ocean Business*, Dec. 1982(3 pp.).
Spherical Union—15° Misalignment; Lyntech Corp. (4 pp.).

\* cited by examiner

*Primary Examiner*—Lynne H. Browne
*Assistant Examiner*—Kenn Thompson
(74) *Attorney, Agent, or Firm*—Conley, Rose & Tayon, P.C.; Jonathan M. Harris

(57) ABSTRACT

A ball and socket misalignment coupling includes a socket flange, ball member, retaining flange, threaded studs, and threaded retaining rings of limited shear strength. The threaded retaining rings function to permit the coupling to be pre-assembled. When the pre-assembled coupling is installed into service by using the threaded studs and associated nuts to bolt the coupling to a standard flange, the threaded rings are stripped out and remain in the assembly without obstructing the function of the coupling. The threaded retaining rings fit into recesses in the flanges through which the studs insert. The threaded retaining rings may made as a single-piece construction made from a material that has a yield and shear strength lower than that of the threaded studs about which they are mounted, or may be made as a two-piece threaded ring having inner threaded portion and a separate outer portion, each with differing material construction. The materials of the two pieces preferably are selected so that once the threaded region strips, the outer geometry can be used as a standard washer.

14 Claims, 4 Drawing Sheets

THREADED RETAINER RINGS FOR USE IN PIPE FLANGE CONNECTIONS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to mechanical joints that connect two pipe ends together. More particularly, the invention relates to threaded rings used to temporarily hold two or more components of any assembly together and then strip away once the components are tightened. Still more particularly, the invention relates to threaded rings used to temporally hold two or more flanges together and then strip away once the pipe ends are tightened.

2. Background of the Invention

In pipeline operations it is often necessary to connect two sections of pipe together that may be at an angle to one another. Pipes that are misaligned are connected together using a joint often referred to as a "misalignment joint" or "misalignment coupling." A conventional misalignment coupling includes a ball welded or otherwise attached to the end of one of the misaligned pipes and a corresponding socket flange attached to the end of the other pipe. The ball, and the pipe to which the ball connects, is able to rotate and swivel with respect to the socket flange. Both the ball and the socket have bores through their longitudinal axis so that fluid can flow from one pipe through the coupling and into the other pipe. For obvious reasons, such a coupling is also referred to as a "ball joint." This type of joint may also be termed a "swivel coupling." The preferred embodiments of the present invention described below represent a substantial improvement to this type of joint regardless of name.

For underwater piping applications, misalignment couplings are used extensively as a result of the elevated costs and difficulties associated with the alignment and assembly of pipe sections under the surface of the sea. The use of misalignment couplings allows sections of pipe that are assembled underwater to have a slackened alignment tolerance with respect to one another.

To assemble underwater piping, specialized and expensive equipment and highly trained divers are utilized. Because of the expenses involved and the limited amount of time that the divers can remain underwater, it is important for sub-sea piping operations to be as fast and simple as possible. One way for valuable underwater time and costs to be saved would be to have misalignment couplings, or ball joints assembled on the surface and sent with the diver underwater as an assembled unit rather than have the diver assemble the components in the water. Assembly on the surface would minimize dive time and its associated expense.

U.S. Pat. No. 4,381,871 discloses one type of a ball joint that can be pre-assembled at the surface. As shown in FIG. 1, which depicts one embodiment of the joint from the patent, the joint connects pipe 12 to pipe 14 and includes a ball and socket swivel system 10 bolted to a standard flange 16. Swivel system 10 includes a ball portion 18, a socket flange 20 and a retaining flange 22. Ball portion 18 is welded to the end of pipe 12 and held in place against socket flange 20 by retainer flange 22. Standard flange 16 is welded to the end of pipe 14. Seal components 24, 26 and 28 help to prevent fluid flowing through the joint from leaking out.

Two separate sets of screws or threaded studs are used to assemble and install the prior art joint of FIG. 1. A short set of screws 30 (although not shown in the cutaway view of FIG. 1, there are multiple screws 30) is used to connect socket and retainer flanges 20 and 22 together. Short screws 30 are used simply to hold the ball 18, socket 20, and retainer 22 components together with seal members 24, 26, and 28 thereby permitting the ball and socket assembly to be pre-assembled. A longer set of threaded studs 32 and corresponding nuts 34 are used to secure the pre-assembled ball and socket swivel system 10 to flange 16. Accordingly, as an assembly, ball and socket system 10 can be lowered into the ocean and the ball portion 18 can be rotated and swiveled by the diver into the orientation that is necessary to connect the pipe 12 to pipe 14. Once the orientation of the ball 18 is determined by the diver, the swivel system 10 is locked and secured to flange 16 by tightening studs 32 and nuts 34.

Although the joint shown in FIG. 1 may be satisfactory, there is considerable room and need for improvement. For instance, it is generally desirable to lower the complexity of a device which usually will reduce the burden on the manufacturing process, minimize the potential for errors to occur, and lower the manufacturing cost of the device. The joint shown in FIG. 1 is a fairly complex type of joint. For instance, the joint requires two sets of studs or screws, 32 and 30, and accordingly, two sets of holes to be drilled through flanges 20 and 22. One set of holes receives long studs 32 while the other set receives short screws 30. Anything that will result in a simpler, easier to manufacture joint would thus be highly desirable.

Accordingly, a ball joint is needed that addresses these concerns. Such a joint preferably would be simpler than conventional joints and could be manufactured at a lower cost. Despite the advantages such a joint would provide, to date no such joint is known to exist.

BRIEF SUMMARY OF THE INVENTION

The issues noted above are addressed in large part by a swivel coupling that includes a ball, a socket flange, a retainer flange, one set of threaded studs and threaded retaining rings threaded about the studs. The threaded retaining rings function to maintain the ball between the socket and retainer flanges at least until the coupling is installed. The threaded retaining rings advantageously permit a second set of screws necessary in prior art joints and associated bores to be eliminated, reducing manufacturing costs and time.

A first embodiment of the threaded retaining ring includes a single piece construction made from a material that has a yield and shear strength lower than that of the threaded studs to which they are threaded. During final assembly in which the pre-assembled swivel coupling is bolted to a standard flange by tightening nuts on either end of the threaded studs, the threaded rings strip out and remain in the assembly without obstructing the function of the coupling. The threaded rings strip away at a load caused by the tightened nuts that is lower than the load on the threaded studs at final assembly. The material specifications and dimensions of the threaded rings can be adjusted to allow any specified amount of flange pre-load required for any given application.

An alternative embodiment of the threaded retaining rings includes a two-piece threaded ring having distinct inner threaded and hardened outer portions. The materials of the two piece construction preferably are selected so that once the inner threaded region strips, the outer portion can be used as a standard washer.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, oil service companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the terms "ball joint," "ball and socket joint," "swivel coupling," and "misalignment joint" are all intended to be synonymous. The claims appended to the end of the following technical description should be read as covering all of these types of joints.

DETAILED DESCRIPTION OF THE PREFERRED EMBODIMENTS

Figure 2:
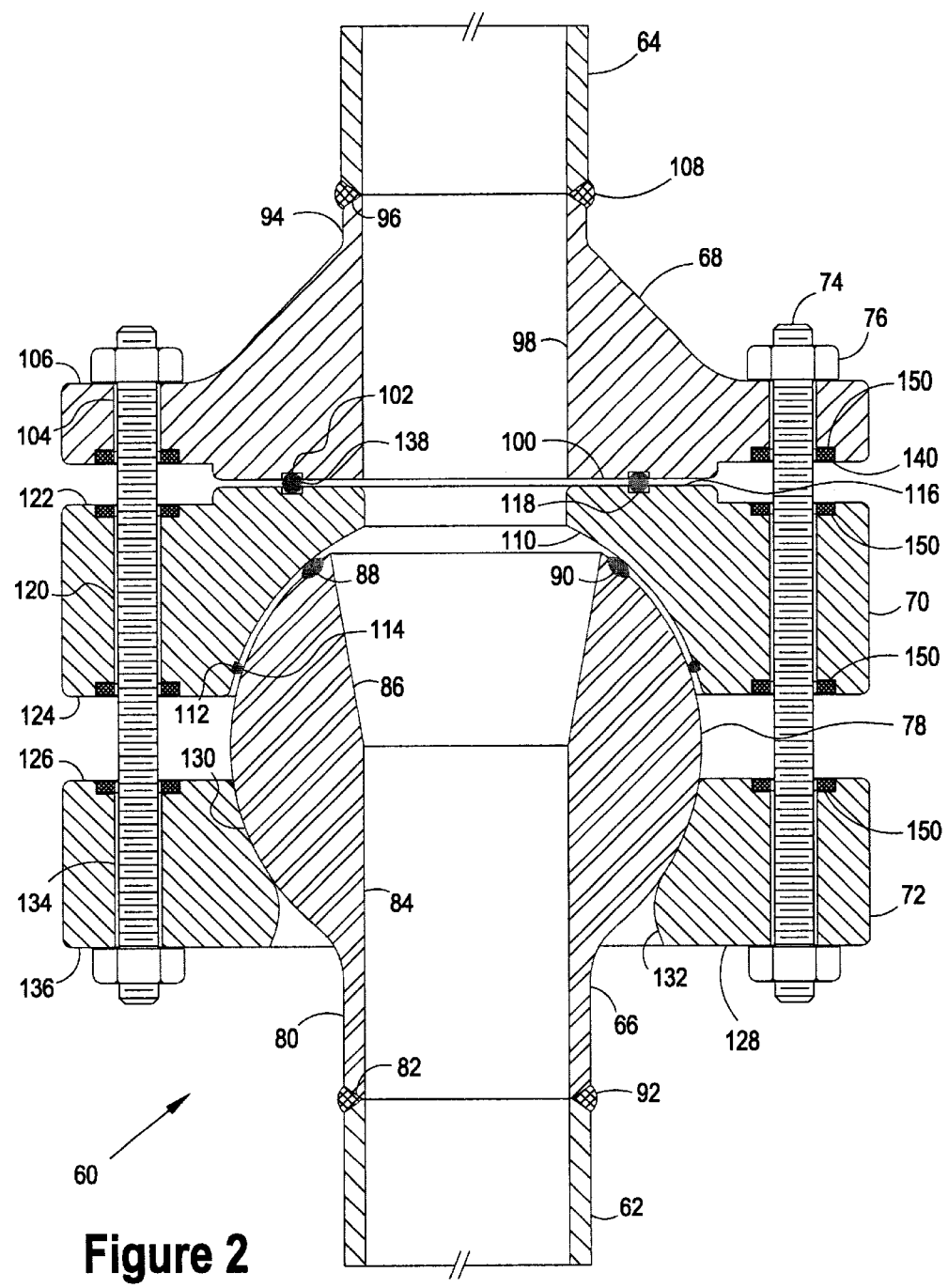
FIG. 2 shows a ball joint constructed in accordance with a preferred embodiment of the present invention that has recessed portions that can receive threaded retaining rings to permit the ball and socket joint to be pre-assembled.

Referring now to FIG. 2, an assembled swivel joint coupling 60 constructed in accordance with a preferred embodiment of the present invention is shown connecting two pipes 62 and 64. Swivel joint coupling 60 includes a ball member 66, a socket flange 70, a retainer flange 72, and a single set of threaded studs 74 and nuts 76. Swivel coupling 60 may include any suitable number of threaded studs 74, but typically will have 8–24 studs depending on the size of the coupling. Swivel coupling 60 is adapted to bolt to a standard flange 68 welded to pipe 64.

Ball member 66 includes a spherical outer surface 78 connected to a straight pipe boss 80 with a weld taper 82. Ball member 66 is connected to pipe 62 by a weld 92. Ball member has a substantially straight flow bore 84 starting at weld taper 82 and transitioning into a frustoconical flow bore 86 near the approximate geometric center of the ball member 66. The leading edge of ball 66 includes a seal pocket 88 that houses an elastomeric, or other suitable material, sealing device 90. Any suitable sealing structure can be used such as that described in U.S. Pat. No. 5,368, 342, incorporated herein by reference in its entirety.

Socket flange 70 has a spherical surface 110 that receives the corresponding spherical surface 78 of ball 66. Socket flange 70 contains a seal groove 112 and an elastomeric, or other suitable sealing device, seal 114. Socket flange 70 also has a flange surface 116 that includes a face seal groove 118. Flange surface 116 mates to a corresponding surface of standard flange 68. Preferably equally spaced about socket flange 70 in a circular pattern, although other patterns are acceptable, is a ring of through holes 120 that extend from a forward face 122 of the socket flange to a rearward face 124 to slidably receive threaded studs 74.

Referring still to FIG. 2, retainer flange 72 includes a forward face 126, a rearward face 128, and a spherical mating surface 130 with a clearance cutaway 132. Spherical mating surface 130 is shaped to correspond to spherical outer surface 78 of ball 66. Clearance cutaway 132 permits the ball 66 to swivel to align misaligned pipes. Also spaced about retainer flange 72 preferably in a circular pattern is a ring of clearance holes 134 that extend from forward face 126 to rearward face 128 of retaining flange 72 for slidable engagement of threaded studs 74. Clearance holes 134 of retaining flange 72 align with holes 120 of socket flange 70 to permit threaded studs 74 to be slidably received therethrough. Rearward face 128 of retaining flange 72 includes bearing faces 136 around holes 134 against which nuts 76 abut.

Swivel joint coupling 60 bolts to standard flange 68. As such, standard flange 68 generally is not a component of the swivel joint coupling 60 per se, but can be manufactured as such if desired. Standard flange 68 includes a pipe boss 94 with a weld taper 96 formed in the end of the pipe boss, a substantially straight flow bore 98, a flange face 100 and a seal groove 102 that corresponds to seal groove 118 of socket flange 70. Flange 68 is preferably an "off the shelf" component, such as a standard API or ANSI specification flange, and has a circular arrangement of through holes 104 that align with through holes 120, 134 of socket flange 70 and retaining flange 72 and receive threaded studs 74. As with retaining flange 72, nut bearing faces 106 around through holes 104 allow the proper seating of nuts 76 at the end of threaded studs 74. Standard flange 68 is attached to pipe 64 by weld 108 at taper 96.

Seal devices 90, 114 act between corresponding spherical surfaces 78, 110 of ball member 66 and socket flange 70 to prevent fluid leakage from swivel coupling 60. The flange faces 100 and 116 of standard flange 68 and socket flange 70 substantially abut one another with their corresponding seal grooves 102 and 118 in alignment and separated by metal or elastomeric seal 138. Seal 138 prevents the connection between the standard flange 68 and the socket flange 70 from leaking. Upon assembly (described in detail below), nuts 76 are tightened pressing the three flanges 68, 70, and 72 together and holding ball member 66 tightly in place. The compression of flanges 68, 70 and 72 energizes seals 90, 114, and 138 and prevents fluid leakage from swivel coupling 60.

Figure 3:
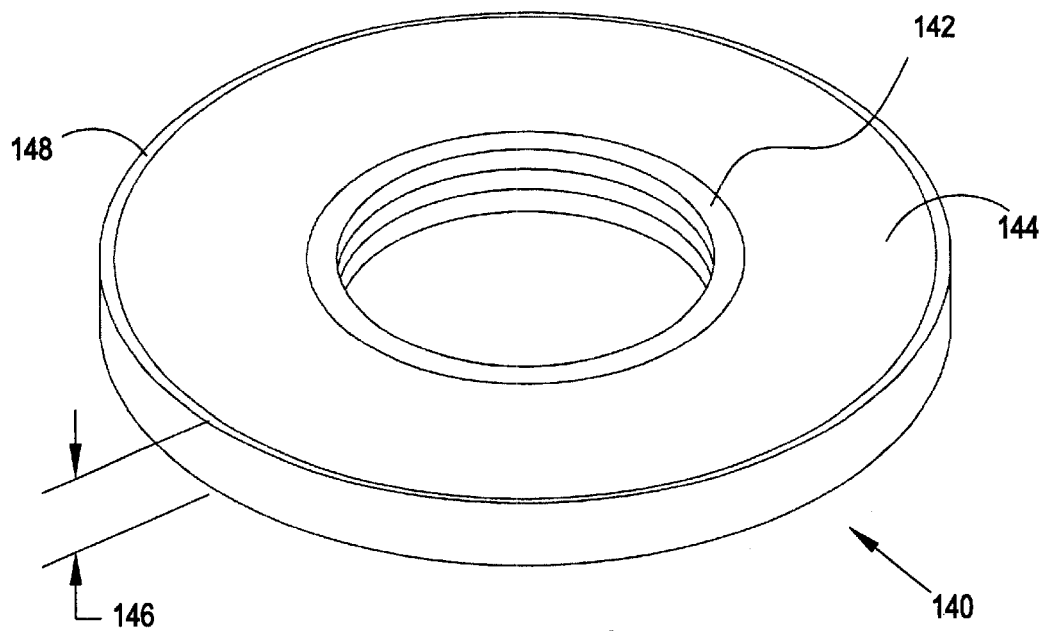
FIG. 3 shows a perspective view of a threaded retaining ring that can be used in the ball joint of FIG. 2.

To solve the problems noted above, swivel coupling 60 can be pre-assembled in the convenience of a factory or another suitable facility. Referring to FIGS. 2 and 3, swivel coupling 60 also includes threaded retaining rings 140 which are installed about threaded studs 74 in between adjacent faces of flanges 68, 70, and 72 in counter-bored pockets 150. Each threaded retaining ring 140, shown in detail in FIG. 3, includes a threaded inner region 142, an outer portion 144 disposed peripherally around the inner portion 142, and an outer chamfer 148 formed at the outer edge of the outer portion 144. The thickness of the inner region 142 and the outer portion 144, identified as 146 in FIG. 3, preferably is uniform throughout the entirety of retaining ring 140, although the thickness can be non-uniform if desired. Threaded retaining rings 140 preferably are manufactured of a material with less yield and shear strength than that of threaded studs 74. Suitable materials include, but are not limited to, lead, nylon, polyethylene, or PTFE. Despite their intentionally diminished strength, threaded retaining rings 140 are sufficiently strong to hold components of the swivel joint coupling 60 together in the preferred relationship until final tightening of studs 74 is required to lock the coupling. Then, during final assembly as nuts 76 are tightened on studs 74, threaded inner region 142 of threaded retaining rings 140 preferably strips or shears out, and rings 140 are free to rotate and move axially, no longer serving a purpose for assembly 60.

Figure 1:
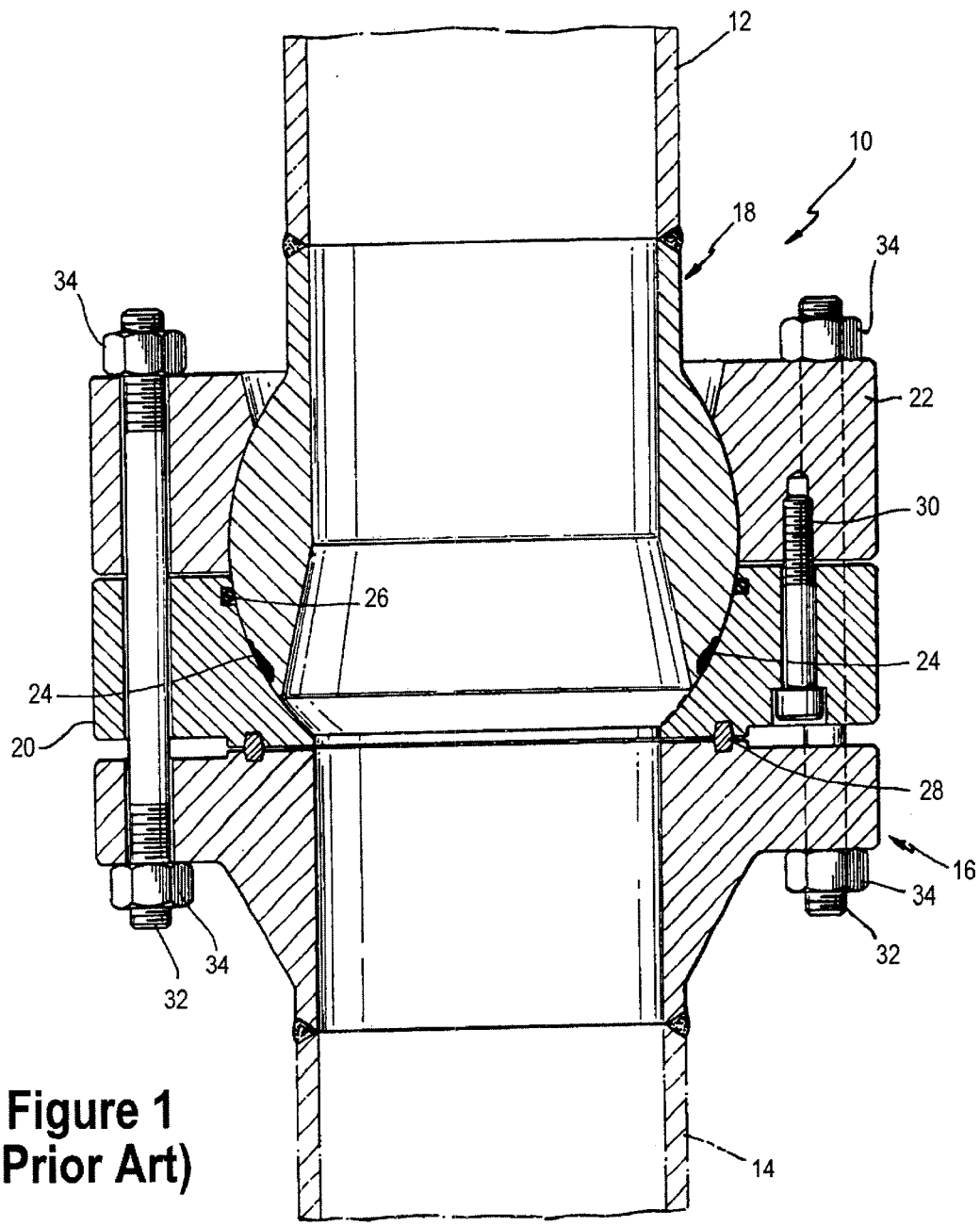
FIG. 1 shows a conventional ball joint requiring two sets of screws or studs.

Thus, threaded rings 140 permit the joint to be pre-assembled while providing significant advantages over the prior art joint of FIG. 1. For instance, the joint of FIG. 1 requires two sets of studs or bolts and two sets of holes must be drilled through the flange to receive the studs/bolts. By contrast, the preferred embodiment of joint 60 of FIG. 2 has only one set of studs/holes and thus is simpler and easier to manufacture. Moreover, replacing a set of bolts and corresponding holes of FIG. 1 with relatively inexpensive and easy to manufacture threaded rings 140 as in FIG. 2 results in a simpler, less costly, and more desirable swivel joint.

Referring again to FIG. 2, counter-bored pockets 150 for housing threaded rings 140 preferably are machined into faces 122, 124, and 126 and are concentric with clearance holes 104, 120, and 134. Threaded rings 140 are installed about studs 74 in the four locations shown for flanges 68, 70, and 72 and are tightened to hold and align the flanges in their desired positions, thereby pre-assembling the joint. Because nuts 76 preferably are installed on faces 106 and 136, threaded rings 140 need not be included at those locations, although they can be included at those locations if desired. Additionally, threaded rings 140 need not be included on every stud 74; placement of threaded rings 140 on a subset of studs 74 may be sufficient to pre-assemble the joint.

Threaded rings 140 can be manufactured to strip away at a predetermined load which may vary from joint to joint as desired. Preferably, the threaded retaining rings strip away at a predetermined load caused by tightening nuts 76 that is lower than the load on threaded studs 74 when nuts 76 are tightened during final assembly. Referring to FIG. 3, the geometries of the inner threaded portion 142 and outer portion 144 of threaded ring 140 are determined by the size of threaded stud 74 used and the amount of axial gap available on flanges 68, 70, and 72. Thickness 146 of threaded ring 140 varies according to the strength of the material selected for the inner region 142, the number of rings used on each side of a flange, the size of the threaded stud 74, and the amount of resistance to shearing that is desired by the designer. The load required to strip the threaded portion of the threaded ring 140 can be generally described by the following:

$$F = S_U d \frac{3\pi}{4} nt \quad \text{(Eq. 1)}$$

Where:
F=Bolt force required to shear threads of a threaded ring
$S_U$=Ultimate shear strength of threaded ring material
d=Minimum pitch diameter of threaded ring
n=Number of threaded rings to shear on each bolt
t=Thickness of the threaded ring The threaded rings 140 preferably are designed by first selecting the desired bolt load, F, at which the rings 140 should shear. Once the shear load is selected, a material with a known shear strength $S_u$ is selected from a list of candidates. The size of threaded studs 74 used in the assembly will determine the minimum pitch diameter, d, of the corresponding threaded rings 140 and the number of rings on each bolt, n, depends on the number and types of components in the assembly. With the values of F, d, $S_u$, and n all known, the designer can solve Equation 1 to calculate the appropriate thickness, t, for manufacturing the threaded rings 140. The calculated thickness, although reasonably accurate, may not be exact and is preferably backed up with experimental data. Once verified experimentally, the thickness can be increased or decreased to achieve the exact amount of strength desired by the designer. If the determined thickness is too large or small to be feasible, the designer can select a material for the ring 140 having a higher or lower ultimate shear strength $S_u$, to allow a more manageable thickness, keeping the other variables constant.

The following discussion explains the pre-assembly and installation of the swivel joint coupling 60 of FIG. 2. The steps described need not necessarily be performed in the order or manner described herein. Pre-assembly of swivel coupling 60 advantageously can be performed at a location away from the job site such as the factory or similar facility and includes the joining of the flanges 70, 72 together with the ball member 66.

First, nuts 76 are assembled onto one end of threaded studs. Second, studs 74 are inserted into bores 134 of the retainer flange 72 so that nuts 76 engage the retainer flange nut face 136. One or more retaining rings 140 are threaded down the end not having the nuts 76 of one or more studs 74 until they are seated within their counterbores 150 in retainer flange 72. At this point nuts 76 or threaded rings 140 may be tightened to further secure the retainer flange in place. After studs 74 are secured to retaining flange 72 with threaded rings 140 and nuts 76, boss 80 is inserted through retaining ring 72 until ball 66 abuts flange 72 as shown. Seal 90 is then placed within pocket 88 of ball 66. One or more additional threaded rings 140 then are threaded down selected studs 74 beyond the point where they are expected to be needed (i.e. closer to flange 72.) Seal 114 is carefully placed within its corresponding groove 112 of socket flange 70 which is then lowered onto threaded studs 74 substantially into the position shown in FIG. 2. Socket flange 70 preferably is positioned so that it is oriented substantially level and parallel to retaining flange 72. Threaded rings 140 previously installed near retainer flange 72 are then threaded up studs 74 until they fit snugly within counterbores 150 on the rear face 124 of socket flange 70. Another set of threaded rings 140 is then threaded down studs 74 until they fit snugly into the counterbores 150 on the forward face 122 of socket flange 70.

Once in position, one set of threaded rings 140 that engages the socket flange is tightened. The remaining lengths of threaded studs 74 are left exposed or may temporarily covered to protect them from shipping damage. The pre-assembled coupling 60 is now ready to be transported to the work site (eg., the ocean floor) where it will be bolted to standard flange 68. Alternatively, swivel coupling 60 can be pre-assembled with standard flange 68.

Threaded rings 140 act to hold the components of swivel coupling 60 in place while it awaits installation and enable swivel coupling 60 to be pre-assembled without the addition of a secondary set of studs or bores. Pre-assembly of underwater structures is desirable because it enables the operator to substantially reduce operating costs and reduce dive time.

Pre-assembled swivel assembly 60 is installed into service by welding the boss end 80 of ball member 66 to the end of adjoining pipe 62 at the weld taper 82. Standard flange 68 is welded to the end of adjoining pipe 64 at the weld taper 96. Seal 138 inserts into seal groove 102 of flange 68 or groove 118 of socket flange 70. Standard flange 68 and socket flange 70 are mated together with threaded studs 74 extending through bores 104 of standard flange 68. The pipe 62 is swiveled until it achieves the desired orientation. With flange 68 in place, nuts 76 are threaded over studs 74 to hold the entire assembly together. After the pipe 62 is rotated and swiveled to its desired orientation, the joint is locked by tightening studs 76. Final tightening engages seals 90, 114, and 138 to prevent leaks and locks the joint in place at the desired misalignment angle.

Tightening may be preformed by any standard means available to the operator including, but not limited to, the use of manual wrenches, torque meters, or hydraulic tensioners. Once tightened, threaded studs 74 exist in a state of tension and retaining rings 140 that oppose this tension are stripped free. Depending on the geometry of swivel coupling 60 and the amount of tension applied to threaded studs 74, it may be possible for some threaded rings 140 to be pulled away from their counter-bores 150 instead of being stripped as described. This situation is acceptable and in no way compromises the integrity of the connection 60.

Figure 4:
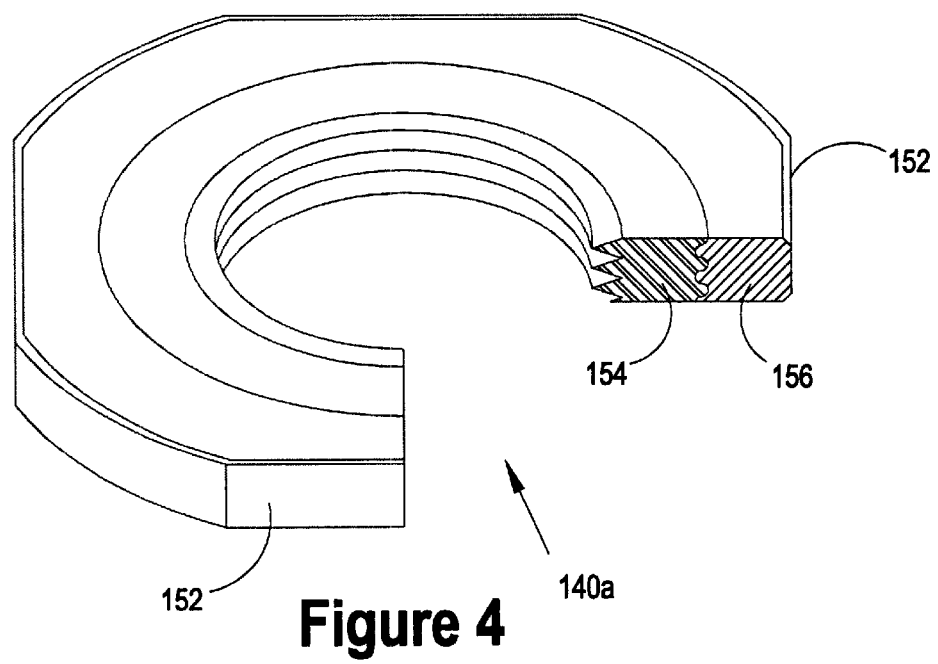
FIG. 4 shows a sectional view of an alternative embodiment of the retaining ring of FIG. 3.

Although it is generally preferable for the threaded rings to be manufactured as one piece as shown in FIG. 3, it may be desirable to have the threaded portion 142 to be manufactured of a material different from that of the outer portion 144. FIG. 4 shows threaded ring 140*a* which is an alternative embodiment of threaded ring 140 of FIG. 3. Alternative threaded ring 140*a* includes an inner threaded portion 154 and an outer portion 156 that have different material compositions and are engaged together in any suitable matter such as inner threaded portion 154 being molded in place as shown or threadedly engaged to outer portion 156.

This embodiment advantageously permits the retaining rings 140*a* to also function as hardened washers following the strip out process. To this end, outer geometry 156 can be formed of hardened steel while inner threaded portion 154 can be manufactured of a molded elastomer. Upon tightening of nuts 76, elastomeric inner threaded portion 154 strips out and hardened steel outside geometry 156 is left to act as a standard washer. FIG. 4 also demonstrates additional features that can be used to assist in the turning of the threaded rings 140. Flat portions 152 or other special features may be machined into the geometry of the threaded rings 140, or 140*a* that would enable a wrench, or other hand tool, to grip and rotate the rings 140. For example, small holes or indentations can be machined into surfaces 144, 156 to permit a spanner wrench to turn the threaded retainer rings.

Figure 5:
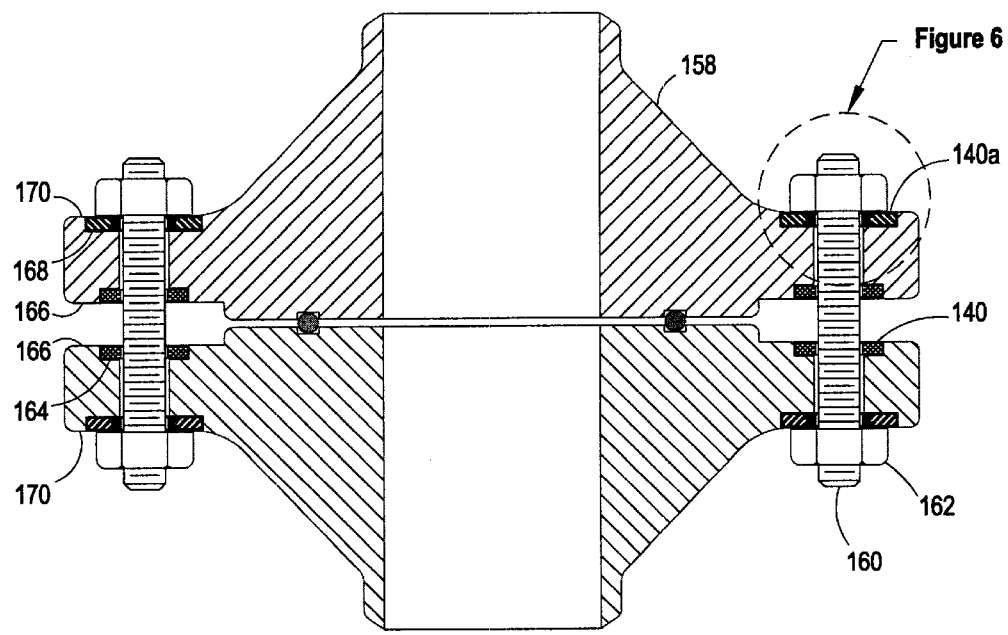
FIG. 5 shows a sectional view of the two-piece retaining ring of FIG. 4 used to connect two flanges together.
Figure 6:
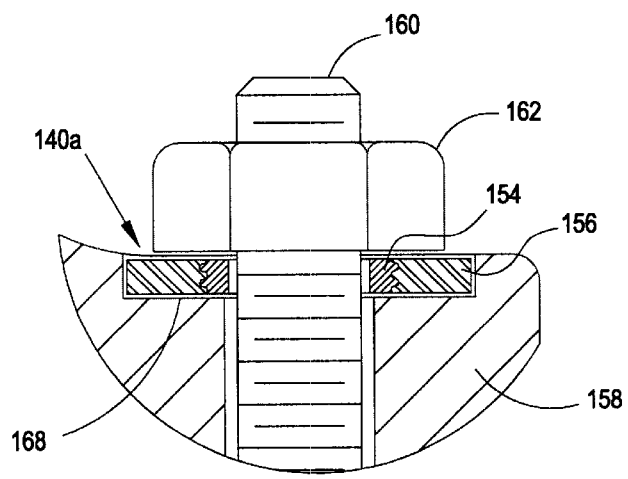
FIG. 6 shows a close up view of the two piece retaining ring of FIG. 5.

FIGS. 5 and 6 show an application using both rings 140 and 140*a* for connecting two standard flanges 158 together with threaded studs 160 and nuts 162. One piece retaining rings 140 are placed in counterbored recesses 164 in the mating sides 166 of the flanges 158 while two piece retaining rings 140*a* are placed in counterbored recesses 168 in the back faces 170 of flanges 158 under threaded nuts 162. Threaded rings, 140 and 140*a*, hold the flange securely in place until nuts 162 need to be added. When nuts 162 are tightened, inner threaded portion 154 strips out and outer portion 156 remains to act as a washer.

An advantage of the preferred embodiments of the present invention over prior art joints is a reduction in complexity and cost. Because of their relatively low material strengths, the threaded rings 140 are relatively inexpensive to manufacture. Further, one entire set of bores and bolts is unnecessary when compared to the prior art joint of FIG. 1. The reduced simplicity of the threaded ring swivel joint retaining design also enables it to be adapted with ease to existing equipment under minimal cost.

The above discussion is meant merely to be illustrative of the principles and various embodiments of the present invention. Numerous variations and modifications will become apparent to those skilled in the art once the above disclosure is fully appreciated. For example, the relative dimensions and geometries of various parts, the materials from which the components are made, and other parameters can be varied. The scope of the following claims should not be limited by the description set out above.

What is claimed is:

1. A swivel joint, comprising:

a socket flange having a substantially spherical inside surface;

a ball member having a substantially spherical outside surface that engages the substantially spherical inside surface of said socket flange;

a retainer flange that engages said ball member opposite said socket flange;

a set of threaded studs and associated nuts to couple said socket flange to said retaining flange, thereby securing said ball member therebetween;

a plurality of threaded retaining rings through which said threaded studs threadedly insert to help hold together said socket flange, ball member and retainer flange; and each of said plurality of threaded retaining rings having an inner threaded portion that engages the threads of the inserted threaded stud, the inner threaded portion strips away at a predetermined load that is lower than the load on said threaded studs when said associated nuts are tightened to lock the swivel joint.

2. The swivel joint of claim 1 wherein said socket member includes a plurality of recessed portions in which two or more threaded retaining ring sit.

3. The swivel joint of claim 1 wherein said retainer flange includes a plurality of recessed portions in which two or more threaded retaining ring sit.

4. The swivel joint of claim 1 wherein the inner threaded portion of said retaining ring comprises an elastomeric compound.

5. The swivel joint of claim 1 wherein the inner threaded portion of said retaining ring comprises a thermoplastic.

6. The swivel joint of claim 1 wherein said threaded portion of said retaining ring comprises lead.

7. The swivel joint of claim 1 wherein said threaded retaining rings comprise an outer portion that is separate from said threaded inner portion.

8. The swivel joint of claim 7 wherein said outer portion and said threaded inner portion are made from different materials.

9. The swivel joint of claim 1 wherein each of said socket flange and said retaining flange include a plurality of recessed portions that receive said threaded retaining rings when the retaining rings are threadedly engaged to said threaded studs to hold said socket flange, ball member and retaining flange.

10. A threaded retaining ring, comprising:

a substantially cylindrical member having a bore therethrough;

said bore having surfaces that define threaded projections that extend into the bore;

said threaded bore adapted to receive a threaded stud of an assembly, the threaded stud adapted to receive nut on either end to hold components of the assembly together; and wherein said threaded projections shear away at a load lower than the load on the threaded stud when the nuts are tightened on either end threaded stud.

11. The threaded retaining ring of claim 10 wherein said threaded projections comprise a material selected from the group consisting of an elastomer, a thermoplastic, and lead.

12. The threaded retaining ring of claim 10 wherein said cylindrical member further surfaces that allow rotation tools to turn said threaded retaining ring relative to said threaded stud.

13. The threaded retaining ring of claim 10 wherein said threaded projections and said cylindrical member are made from different materials.

14. A method of assembling a flanged joint, comprising:

placing a plurality of threaded retaining rings having threaded portions in recesses formed in opposing faces of a plurality of flanges;

engaging threaded studs through said threaded retaining rings;

tightening said threaded retaining rings about said threaded studs on each of said flanges to hold said flanged joint together; and locking said flanged joint by threading nuts on opposite ends of said threaded studs until said threaded portions of said threaded retaining rings strip away.

* * * * *